United States Patent [19]

Matsui et al.

[11] Patent Number: 4,990,414
[45] Date of Patent: Feb. 5, 1991

[54] CADMIUM NEGATIVE ELECTRODE FOR USE IN AN ALKALINE STORAGE CELL AND ITS MANUFACTURING METHOD

[75] Inventors: Kazuhiro Matsui, Tokyo; Akira Sugano, Sumoto; Ichirou Yoshida, Sumoto; Yukiharu Nishikawa, Sumoto; Toshiaki Shiojiri, Sumoto; Takahisa Awajitani, Sumoto; Shinsuke Nakahori, Sumoto; Yuji Morioka, Hyogo, all of Japan

[73] Assignee: Sanyo Electric Co., Ltd., Osaka, Japan

[21] Appl. No.: 476,927

[22] Filed: Feb. 8, 1990

[30] Foreign Application Priority Data

Feb. 9, 1989 [JP] Japan .................................. 1-30398
Mar. 29, 1989 [JP] Japan .................................. 1-80138
Jun. 13, 1989 [JP] Japan .................................. 1-150931
Oct. 9, 1989 [JP] Japan .................................. 1-263544

[51] Int. Cl.$^5$ ........................ H01M 4/62; H01M 4/26
[52] U.S. Cl. ...................................... 429/217; 429/222
[58] Field of Search ............... 429/217, 222; 29/623.5

[56] References Cited

U.S. PATENT DOCUMENTS 2,870,234  1/1959  Moulton .
3,121,029  2/1964  Duddy ............................. 429/222 X
3,888,695  6/1975  Catherino ....................... 429/222 X
4,563,370  1/1986  Menard ........................... 429/217 X
4,689,880  9/1987  Brezillon et al. ................. 29/623.5

FOREIGN PATENT DOCUMENTS 56-82573   7/1981  Japan .
61-158664  7/1986  Japan .
61-158666  7/1986  Japan .

Primary Examiner—Stephen J. Kalafut
Attorney, Agent, or Firm—Armstrong, Nikaido, Marmelstein, Kubovcik and Murray

[57] ABSTRACT

A rechargeable alkaline storage cell mainly comprising a negative electrode including polyvinyl pyrolidone having a degree of polymerization of 350 to 1,000, a positive electrode, and an alkaline electrolyte, and its manufacturing method are disclosed. This invention may be employed for the sintering method or for the non-sintering method of manufacturing a negative electrode.

16 Claims, 12 Drawing Sheets

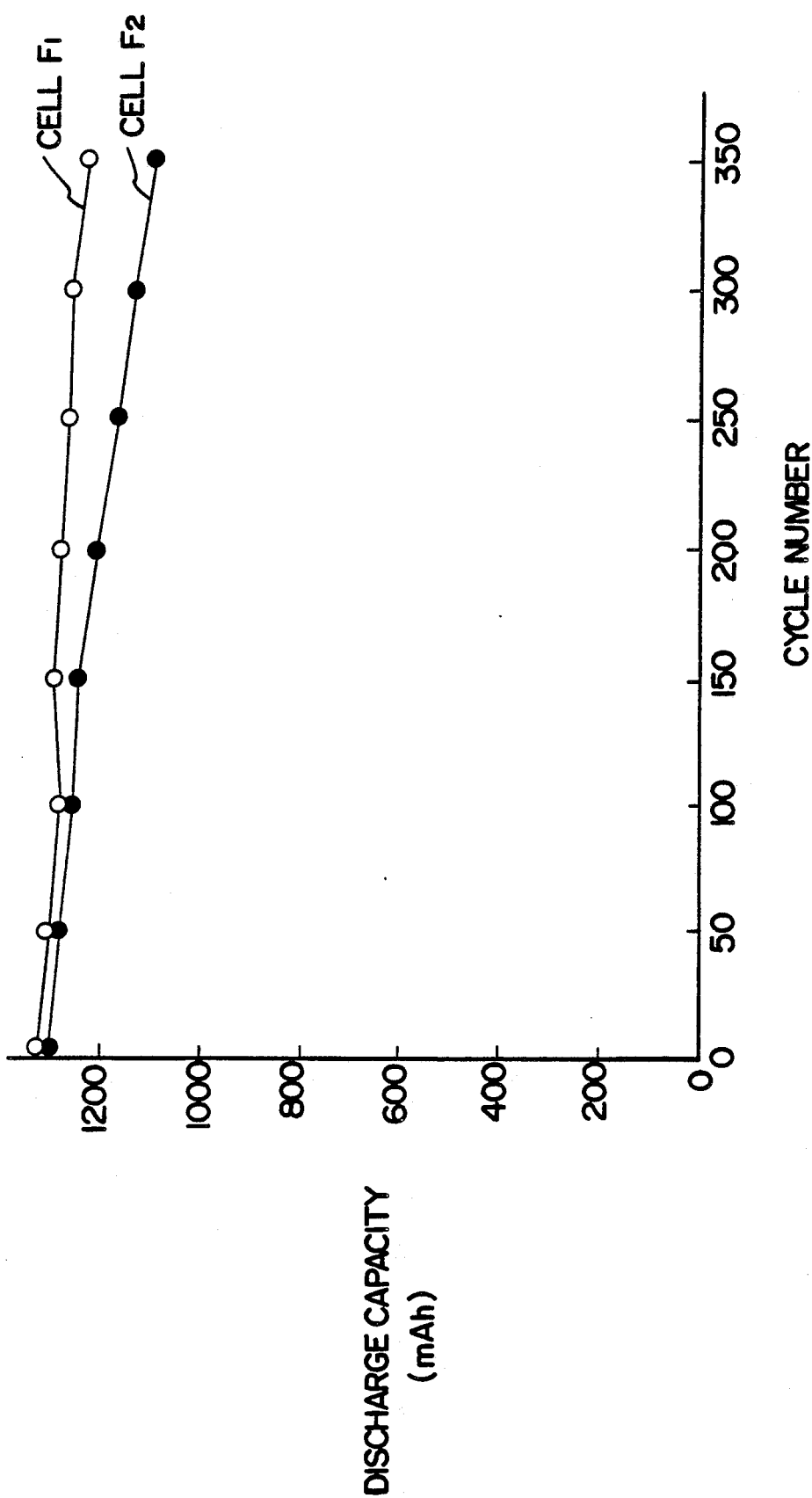

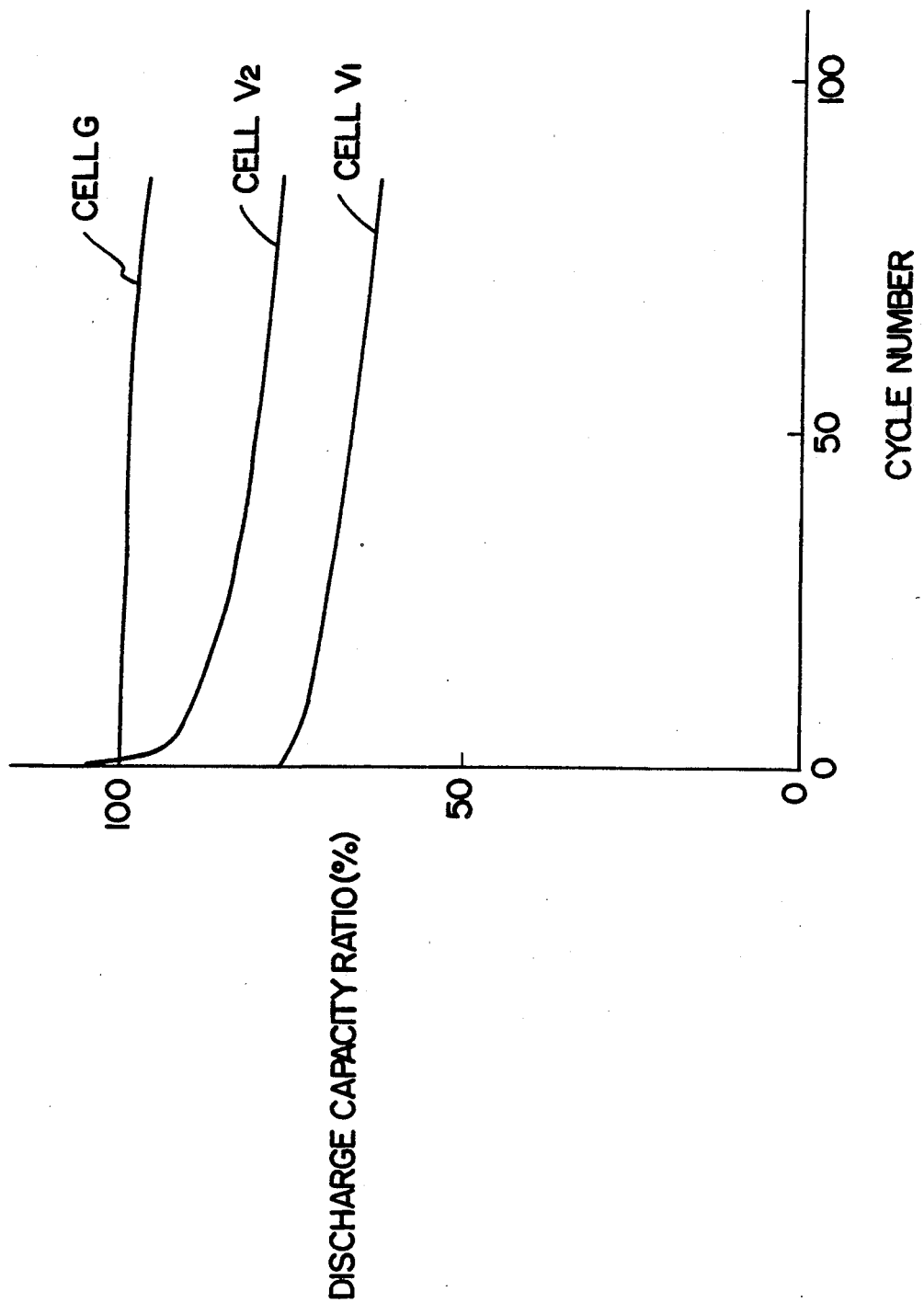

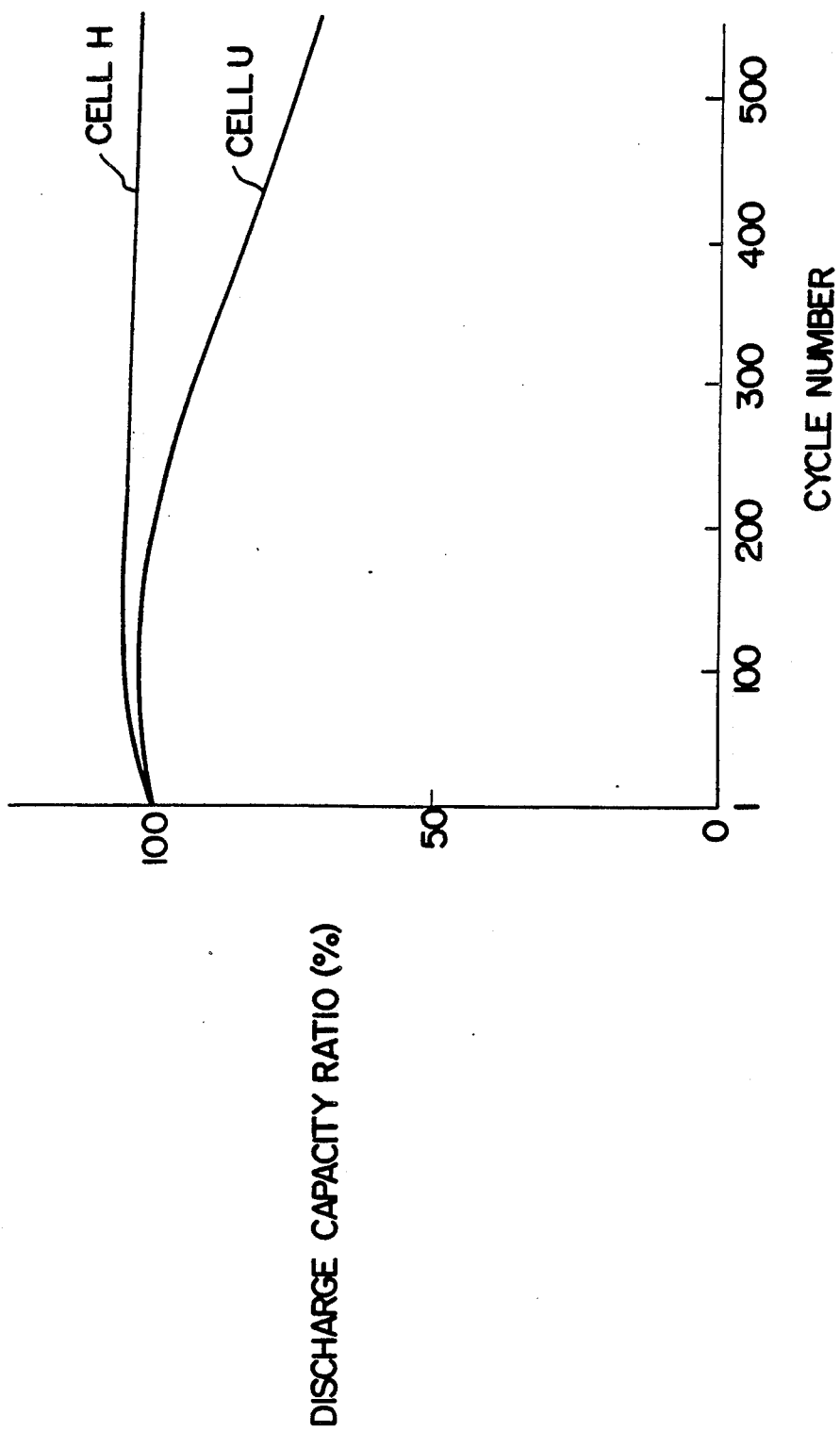

CADMIUM NEGATIVE ELECTRODE FOR USE IN AN ALKALINE STORAGE CELL AND ITS MANUFACTURING METHOD

BACKGROUND OF THE INVENTION (1) Field of the Invention

This invention relates to a cadmium negative electrode for use in an alkaline storage cell and its manufacturing method.

(2) Description of the Prior Art

Generally, an electrode for use in an alkaline storage cell is manufactured by the following two methods:

(a) Sintering method as disclosed in Japanese Patent Publication laid-open No. 51-18834. A porous nickel sintered plaque is immersed in a solution of such a salt as cadmium nitrate acting as an active material, alkali-treated, rinsed and dried. The above procedure is repeated several times, whereby to impregnate the plaque with a desired amount of active material. An electrode produced by this method will be referred to as a sintered type electrode.

(b) Non-sintering method as disclosed in Japanese Patent Publication laid-open No. 56-82573. Powdered active material formed of cadmium oxide or cadmium hydroxide is kneaded with a binder into a paste. The paste is coated on a conductive substrate or the like and dried. An electrode produced by this method will be referred to as a non-sintered type electrode.

[Advantages and Disadvantages of the Sintered Method]

Advantage I

Since the active material is in direct contact with the plaque with no binder or the like therebetween, the conductivity of the electrode is not lowered.

Advantage II

Since a conductive matrix of the porous nickel sintered plaque is existent in the electrode, the electrode is highly conductive and has more excellent characteristics than the non-sintered type electrode.

Disadvantages

If a cadmium compound formed of cadmium hydroxide or cadmium oxide is used as an active material for such a highly conductive electrode, undischarged metal cadmium is accumulated in the course of charge-discharge cycles. This is caused by: fine grains of cadmium hydroxide cover a surface of the metal cadmium, and thus obstruct the supply of hydroxide ions from the electrolyte. As a result of the accumulation of the metal cadmium, the electrode lowers its capacity and cycle characteristic. In order to prevent the above problem that the metal cadmium is covered with cadmium hydroxide, the following two have been proposed.

(a) Forming a high polymer layer on a surface of the cadmium active material (Japanese Patent Publication laid-open No. 61-158666) or on a surface of the electrode (Japanese Patent Publication laid-open No. 61-158664)

(b) Adding polysaccharide and its derivatives to the active material (Japanese Patent Publication Kokai No. 63-195963)

The above (a) adjusts the supply of the hydroxide ions, whereby to generate α-cadmium hydroxide having needle-shaped crystals. Although this method prevents the metal cadmium from being covered, it also prevents oxygen gas from being absorbed into the active material when oxygen gas should be absorbed for chemical reaction. This brings a great damage especially to the sintered-type electrode, which would be excellent in the oxygen gas absorbing ability.

The above (b), utilizing that polysaccharide and its derivatives reduce the depositing core of cadmium hydroxide during discharging, prevents the grains of cadmium hydroxide from getting fine. As a result, the metal cadmium is not covered by the grains of cadmium hydroxide. However, since the binder is not adhered on the active material strongly, the active material comes off from the electrode plate in the course of charge-discharge cycles. This lowers the utilization factor of the active material and so the electrode capacity, which means there is no practical effects of adding polysaccharide and its derivatives. Adding too much of them in order to keep their effects for a long period lowers the oxygen gas absorbing ability.

[Advantages and Disadvantages of the Non-Sintering Method]

Advantage

The simple procedure lowers the cost.

Disadvantage I—Accumulation of Undischarged Metal Cadmium

When cadmium oxide as an active material and water as a solvent are kneaded into a paste, cadmium oxide reacts with water into cadmium hydroxide. This hardens the active material paste so as to lower operability and also to prevent the produced electrode plates from having the uniform quality.

In order to prevent the above hydration of cadmium oxide, a hydration preventor such as phosphoric acid is added to the active material paste (Japanese Patent Publication laid-open No. 58-48990) or water is replaced with an organic solvent. These two methods prevents the active material paste from hardening to improve operability. Moreover, the soft active material paste is effectively impregnated when pressed.

However, the soft active material paste also causes the problem that, when the negative electrode is wound around with a positive electrode and a separator by a pressure roller or the like to make an electrode assembly, the outermost end of the negative electrode of the assembly is given more pressure than its innermost end, whereby the outermost end is thinner than the innermost end, resulting in reducing the porosity of the negative electrode plate.

Comparing the average porosity of a negative electrode not subjected to electrochemical formation and that of another negative electrode subjected to electrochemical formation, the former is generally smaller than the latter. Accordingly, if a cell employing the negative electrode not subjected to electrochemical formation is to retain the same amount of electrolyte as a cell employing the negative electrode subjected to electrochemical formation, the former negative electrode retains a smaller amount of electrolyte and so the separator has larger amount of electrolyte. This type of cell, in which oxygen gas generated during charging is absorbed into the cadmium negative electrode, has a specified amount for the electrolyte retained in the separator. If a larger amount of electrolyte than specified is retained in the separator, it is difficult for oxygen gas to reach the negative electrode, resulting in decline of the oxygen gas absorbing ability. Keeping the oxygen gas absorbing ability at a certain level requires more strict restriction of the electrolyte amount than the cell employing the negative electrode subjected to electrochemical formation. However, such restriction causes undischarged metal cadmium to be accumulated in the course of charge-discharge cycles. This increases the porosity of the negative electrode so as to retain more electrolyte, whereby the separator retains less electrolyte to lower the discharge characteristic and capacity of the cell. Although electrochemical formation solves these problems, it requires large-scale equipment and a complicated procedure, leading to higher manufacturing cost.

The following proposals have been made in order to improve the cell performance with less cost.

(a) An active material paste mainly comprising cadmium oxide is coated on a conductive substrate while restricting hydration of the active material, whereby to obtain a cadmium electrode plate. Then, the plate is immersed in an aqueous solution of alkali to hydrate cadmium oxide.

(b) Polyvinyl pyrolidone (P.V.P.) as a binder is added to the above paste (U.S. Pat. No. 2,870,234). (Described below is a pocket-type negative electrode.)

The above (a) also accumulates undischarged metal cadmium in the course of charge-discharge cycles. In consequence, the negative electrode has a lower capacity than the positive electrode, and so lowers the cell capacity.

According to the above (b), formation of cadmium hydroxide comprising fine grains is restricted during discharging (especially during high-rate discharging where cadmium electrode is easily deteriorated). This leads to restriction of active material inactivation. However, decline of oxygen gas absorbing ability due to the use of unhydrated cadmium cannot securely be prevented. Furthermore, the above Patent does not disclose any degree of polymerization of P.V.P., the effects of adding P.V.P. is not fully shown.

For the purpose of solving the above problems, the inventors of the present invention added a high polymer compound such as P.V.P. to an active material paste mainly comprising cadmium oxide, and immersed the obtained substance in an aqueous solution of alkali for hydration. Hydration was conducted to improve oxygen gas absorbing ability. However, elution of the high polymer compound during rinsing caused accumulation of metal cadmium and thus decline of the cycle characteristic.

Disadvantage II—Decline of Oxygen Gas Absorbing Ability

In an alkaline storage cell comprising a cadmium negative electrode, oxygen gas generated from the positive electrode is recombined during charging in the following two steps:

$$O_2 + 2H_2O + 4e^- \rightarrow 4OH^- \quad (1)$$

$$4OH^- + 2Cd \rightarrow 2Cd(OH)_2 + 4e^- \quad (2)$$

The reaction of (1) occurs at a part where oxygen gas, the electrolyte and the conductive portion of the electrode are in contact with one another. The following problem occurs in the case of a non-sintered type electrode. Since this type of electrode has no conductive matrix, its oxygen gas recombination ability is extremely poor. Accordingly, the cell inner pressure is increased to operate the safety valve. When this occurs, the electrolyte is leaked as well as oxygen gas. As a result, the electrolyte in the cell is reduced in amount and the cell performance is drastically lowered.

Japanese Patent Publication Kokai No. 60-63875 has disclosed adding an electrically conductive material on a surface of the electrode. However, since this type of material does not directly contribute to restriction of cadmium active material inactivation, the cell capacity and the cycle characteristic are lowered.

SUMMARY OF THE INVENTION

Accordingly, a primary object of the present invention is to provide a cadmium negative electrode for use in an alkaline storage cell having an excellent cycle characteristic and its manufacturing method.

Another object of this invention is to provide a cadmium negative electrode for use in an alkaline storage cell which prevents accumulation of undischarged metal cadmium and thus restricts inactivation of the active material, and its manufacturing method.

Still another object of this invention is to provide a cadmium negative electrode for use in an alkaline storage cell which prevents decline of oxygen gas absorbing ability, and its manufacturing method.

Still another object of this invention is to provide a manufacturing method of an alkaline storage cell having a cadmium negative electrode, the method improving operability with less cost.

The above objects are fulfilled by a rechargeable alkaline storage cell "A" comprising a negative electrode including a cadmium active material, the negative electrode including polyvinyl pyrolidone having a degree of polymerization of 350–1,000; a positive electrode; a separator interposed between the negative and positive electrodes; and an alkaline electrolyte included in the separator.

The negative electrode may be a sintered-type electrode, which has a sintered plaque.

The negative electrode may be a paste-type electrode, which comprises a paste of active material and a conductive substrate.

The above alkaline storage cell is manufactured by a manufacturing method "B" of a rechargeable alkaline storage cell, comprising a first step of filling a nickel sintered plaque with a cadmium active material to produce a base plate; a second step of immersing the base plate in a solution of polyvinyl pyrolidone having a degree of polymerization of 350–1,000 to produce a cadmium negative electrode; and a third step of winding the negative electrode and a positive electrode with a separator therebetween to obtain an assembly and loading the assembly in a cell can while impregnating the separator with an alkaline electrolyte.

The above alkaline storage cell is manufactured by a manufacturing method "D" of a rechargeable alkaline storage cell, comprising a first step of coating a paste comprising a cadmium active material and a binder on a conductive substrate to produce a base plate; a second step of immersing the base plate in a solution of polyvinyl pyrolidone having a degree of polymerization of 350–1,000 to produce a cadmium negative electrode; and a third step of winding the negative electrode and a positive electrode with a separator therebetween to obtain an assembly and loading the assembly in a cell can while impregnating the separator with an alkaline electrolyte.

It is attributed to the following reasons that the above objects are fulfilled by the above constructions and methods.

Adding polyvinyl pyrolidone to the negative electrode restricts cadmium hydroxide comprising fine grains from being formed during discharging, and thus prevents inactivation of the active material.

However, if the degree of polymerization of polyvinyl pyrolidone is less than 350, its resistance to oxidation is lowered and therefore the polyvinyl pyrolidone is decomposed to generate carbonate ion. Accompanied by increase of carbonate ion, the electrolyte decreases its conductivity and also cadmium promotes dendrite generation, whereby the cell performance is lowered.

If the degree of polymerization of the polyvinyl pyrolidone is more than 1,000, the cycle characteristic is also lowered. Why this occurs is still unknown, but is attributed to the following. The larger molar weight of polyvinyl pyrolidone is, the less force polyvinyl pyrolidone is bound to the active material with. This promotes crystallization of polyvinyl pyrolidone and therefore advances its separation from the active material in the course of charge-discharge cycles.

If the degree of polymerization is 350–1,000, polyvinyl pyrolidone has excellent enough resistance to oxidation to prevent inconveniences such as decline of the electrolyte conductivity and also polyvinyl pyrolidone is not separated from the active material even when charge-discharge cycle is advanced. These two facts restrict decline of the cycle characteristic. Furthermore, undischarged metal cadmium is restricted from accumulating.

In the rechargeable alkaline storage cell "A", polyvinyl pyrolidone may be contained in at least 2 mg against 1 g of the cadmium active material.

Polyvinyl pyrolidone included in 2 mg or more against 1 g of the cadmium active material is enough to cover all over the active material. This means it is enough to restrict decline of the cycle characteristic.

In the manufacturing method "B", the base plate may be filled with water after the first step.

According to this method, since a solution of polyvinyl pyrolidone is easily soaked deep into the base plate filled with the active material, the cycle characteristic is improved.

In the method "B", the cadmium negative electrode may be immersed in an alkaline solution having a temperature of 100° C. at the lowest after the second step. This method will be referred to as "C".

According to this method, particles of polyvinyl pyrolidone are bridged with one other. This obstructs elution of polyvinyl pyrolidone into the alkaline electrolyte and thus further restricts accumulation of undischarged metal cadmium.

In the method "C", a surface of the cadmium negative electrode may be brushed after immersed in the solution.

According to this method, since polyvinyl pyrolidone exists only inside the negative electrode, metal cadmium generated during charging is easily contacted with oxygen gas. This fully utilizes the added polyvinyl pyrolidone as well as improving oxygen gas absorbing ability.

In the method "C", the cadmium negative electrode may be subjected to electrochemical formation after immersed in the solution.

This method improves the activity of the cadmium active material and thus further improves the cycle characteristic.

In the method "D", the cadmium active material may mainly comprise cadmium oxide and the base plate may be immersed in an alkaline solution to hydrate the cadmium oxide after the first step.

The above method forms active material matrix without fail for the following reason and so further improves the cycle characteristic (especially in high-rate discharging).

When the base plate produced in the first step, the base plate being filled with the active material, is immersed in an aqueous solution of alkali, cadmium oxide mainly forming the active material is hydrated by the formula (3) into cadmium hydroxide.

$$CdO + H_2O \rightarrow Cd(OH)_2 \qquad (3)$$

Since the cadmium hydroxide has a smaller density than cadmium oxide, grains of the active material are expanded in volume and thus are contacted with one another to form a matrix. Since polyvinyl pyrolidone is not included at this time, the matrix is certainly formed with no prevention.

In the method "D", wherein the solution of polyvinyl pyrolidone may include a conductive material.

This method restricts decline of the conductivity, which would be caused by polyvinyl pyrolidone, and thus oxygen gas recombination ability is improved to further improve the cycle characteristic.

The above alkaline storage cell is manufactured by a manufacturing method of a rechargeable alkaline storage cell, comprising a first step of mixing an active material mainly comprising cadmium oxide, polyvinyl pyrolidone having a degree of polymerization of 350–1,000, water and a hydration preventor to produce an active material paste while preventing hydration of the cadmium oxide; a second step of coating the active material paste on a porous conductive substrate to produce an unhydrated electrode plate; a third step of prehydrating the unhydrated electrode plate in an alkaline solution having a temperature of 100° C. or higher to produce a cadmium negative electrode; and a fourth step of winding the negative electrode and a positive electrode with a separator therebetween to obtain an assembly and loading the assembly in a cell can while impregnating the separator with an alkaline electrolyte.

The above method further restricts accumulation of undischarged metal cadmium for the following reason and thus improves the cycle characteristic.

If hydration is conducted in an alkali having as high a temperature as 100° C. or more, particles of polyvinyl pyrolidone are bridged with one another and is hard to dissolve in water. Accordingly, polyvinyl pyrolidone is not eluted when alkali is rinsed off.

Moreover, the high temperature of hydration by alkali shortens the hydration process, whereby to improve operability.

The hydration also improves oxygen gas absorbing ability.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings.

FIG. 10 is a graph showing cycle characteristics of Cells $F_1$ and $F_2$ according to the present invention;

FIG. 11 is a graph showing cycle characteristics of Cell G according to the present invention and Cells $V_1$ and $V_2$ as comparative examples; and FIG. 12 is a graph showing cycle characteristics of Cell H according to the present invention and Cell U as a comparative example.

DESCRIPTION OF THE PREFERRED EMBODIMENTS

Embodiment I

[Pre-experiment I]

(Production of cells for experiment)

Nickel sintered plaques were submerged to the active material filling operation five times in which the plaques were immersed in a solution mainly comprising cadmium nitrate and then alkali-treated, whereby to obtain Base Plates A containing various amounts of cadmium nitrate as an active material. Base Plates A were immersed first in water and then in aqueous solutions of polyvinyl pyrolidone having various degrees of polymerization and dried, whereby to obtain cadmium negative electrodes including 2 mg of polyvinyl pyrolidone against 1 g of the active material.

The above electrodes were respectively wound with nickel sintered positive electrodes with separators therebetween to produce electrode assemblies. The assemblies were respectively put in cell cans and electrolytes were injected into the cans, thereafter the cans were sealed to produce cells, each having a nominal capacity of 1,200 mAh.

(Experiment)

Figure 1:
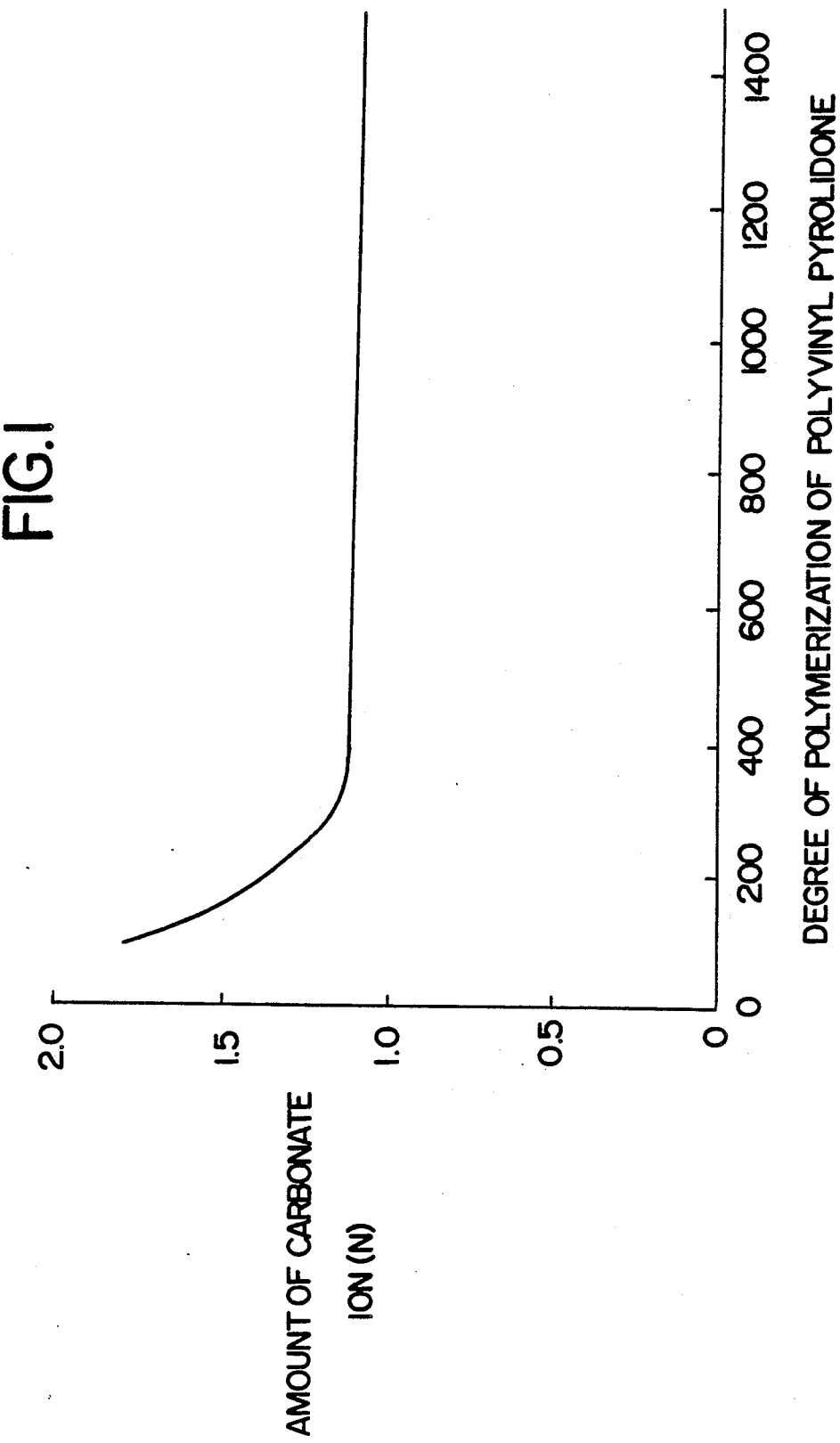
FIG. 1 is a graph showing the relationship between the degree of polymerization of polyvinyl pyrolidone and the amount of carbonate ion in the electrolyte.

The cells obtained above were each subjected to an overdischarge test to check the relationship between the degree of polymerization of polyvinyl pyrolidone and the amount of carbonate ion in the electrolyte. The results are shown in FIG. 1. The cells were charged by 400 mA at 20° C. for a week.

As apparent from FIG. 1, the amount of carbonate ion increased as the degree of polymerization was reduced below 350. However, the above amount was kept at substantially the same level when the above degree was 350 or more.

[Pre-experiment II]

Cadmium negative electrodes each having a nominal capacity of 3,000 mAh were produced by the same method as in Pre-experiment I. The cadmium negative electrodes were each interposed between a pair of same-sized nickel sintered positive electrodes with separators therebetween, whereby to produce cells.

(Experiment)

Figure 2:
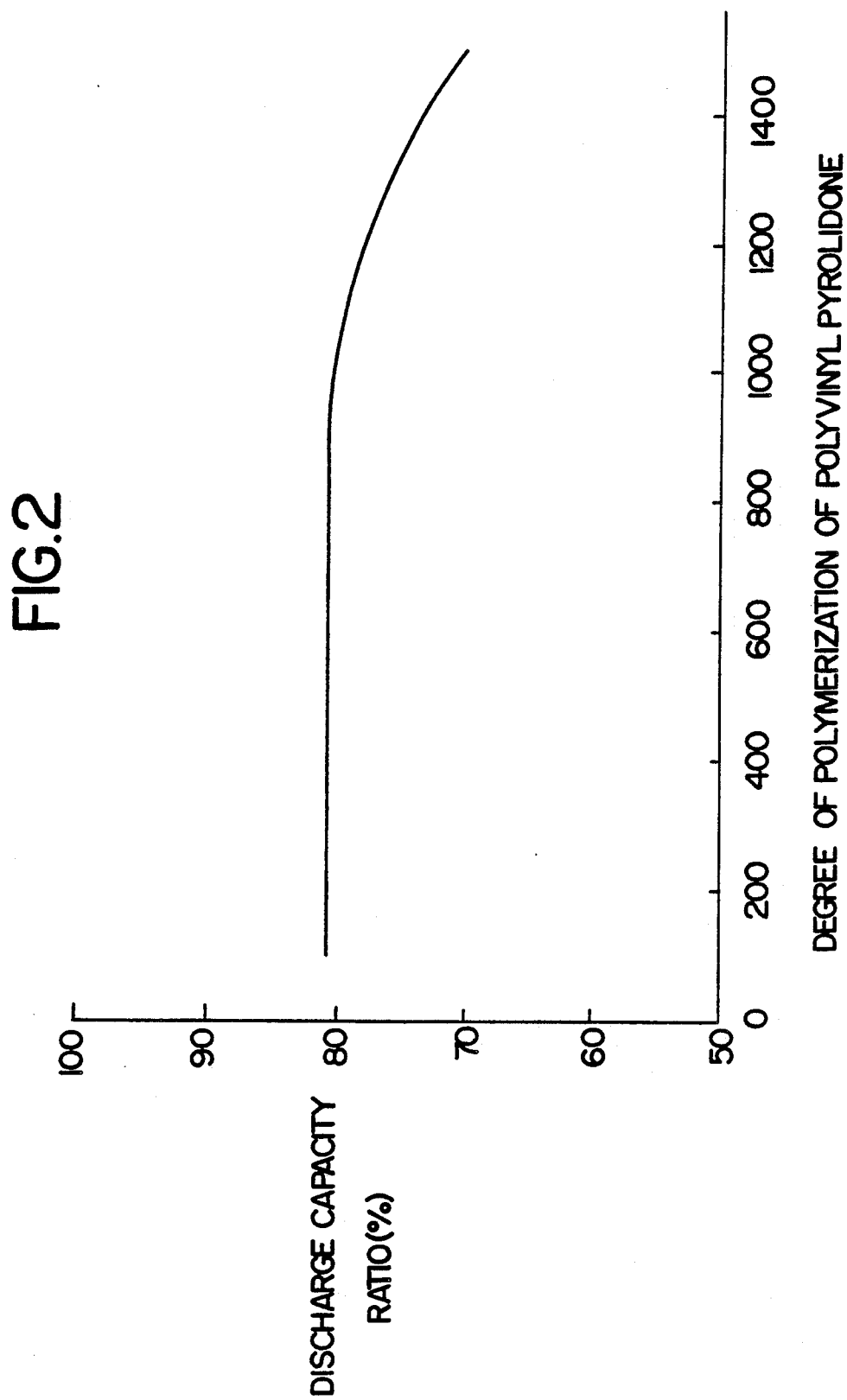
FIG. 2 is a graph showing the relationship between the degree of polymerization of polyvinyl pyrolidone and the discharge capacity ratio of the negative electrode.

The cells obtained above were used to check the relationship between the degree of polymerization of polyvinyl pyrolidone and the discharge capacity ratio of the negative electrode. The results are shown in FIG. 2. Each cell was charged by 1,000 mA for 4.8 hours and discharged by 3,000 mA until the voltage was reduced down to 0.8 V. The discharge capacity ratio in this pre-experiment means the ratio of the discharge capacity after 10th cycle against that after the first cycle.

FIG. 2 shows that the discharge capacity ratio was reduced when the above degree exceeded 1,000.

[Embodiment A]

(Embodiment I according to this invention)

Cell $A_1$ having a nominal capacity of 1,200 mAh was produced by the same method as in Pre-experiment I except that polyvinyl pyrolidone having a degree of polymerization of 400 was used.

(Embodiment II according to this invention)

Cell $A_2$ having a nominal capacity of 1,200 mAh was produced by the same method as in Pre-experiment I except that polyvinyl pyrolidone having a degree of polymerization of 800 was used.

(Comparative example I)

Cell $Z_1$ having a nominal capacity of 1,200 mAh was produced by the same method as in Pre-experiment I except that polyvinyl pyrolidone having a degree of polymerization of 100 was used.

(Comparative example II)

Cell $Z_2$ having a nominal capacity of 1,200 mAh was produced by the same method as in Pre-experiment I except that polyvinyl pyrolidone having a degree of polymerization of 2,000 was used.

(Comparative example III)

Cell $Z_3$ having a nominal capacity of 1,200 mAh was produced by the same method as in Pre-experiment I except that Base Plate A was not added with polyvinyl pyrolidone.

(Experiment)

Figure 3:
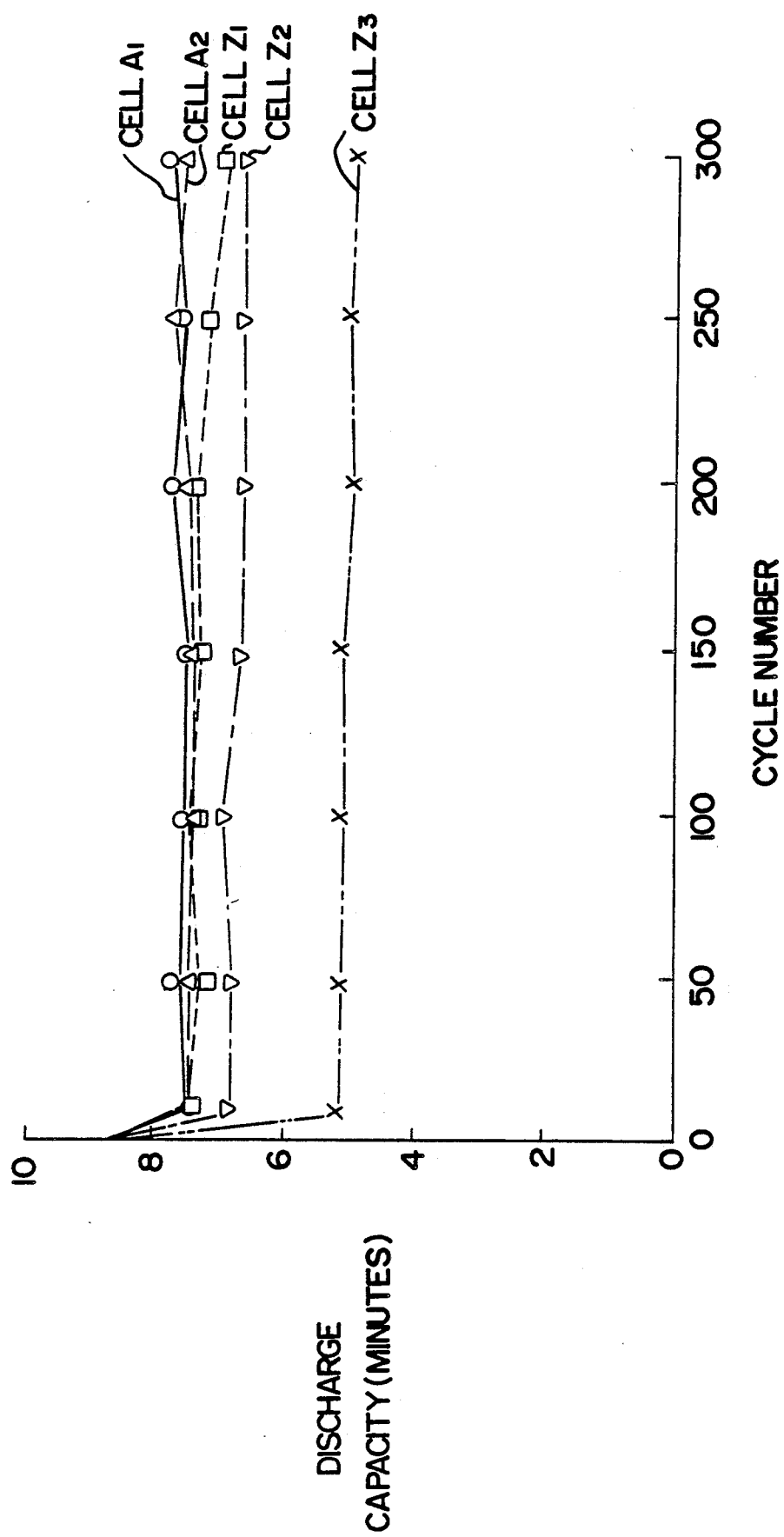
FIG. 3 is a graph showing cycle characteristics of Cells $A_1$ and $A_2$ according to the present invention and Cells $Z_1$ through $Z_3$ as comparative examples.

Cycle characteristics of Cells $A_1$ and $A_2$ and Cells $Z_1$ through $Z_3$ were checked and are shown in FIG. 3. Each cell was charged by 120 mA for 16 hours and discharged by 10A until the voltage was reduced down to 1.0 V. Since the discharge conditions were extremely high-rate, undischarged metal cadmium was easily accumulated, whereby to possibly cause the negative electrode to have a smaller capacity than the positive electrode. Accordingly, it can be the that the cycle characteristics in FIG. 3 are high-rate discharge characteristics of the negative electrodes.

Reduction of capacity during the initial stage of discharge was small in Cells $A_1$ and $A_2$ according to this invention but drastically large in Cells $Z_2$ and $Z_3$ as comparative examples. In the case of Cell $Z_1$, although the above reduction was small, another reduction was seen after approximately the 250th cycle. This is attributed to that polyvinyl pyrolidone having a degree of polymerization of 100 was decomposed and so increased the carbonate ion, which reduced the conductivity of the electrolyte.

It has been found by the Pre-experiments I and II and Embodiment A that cell performance can remarkably be improved by adding polyvinyl pyrolidone having a degree of polymerization of 350–1,000 to the cadmium negative electrode.

[Embodiment B]

(Embodiment I according to this invention)

Cell B was produced by the same method as Cell $A_1$ except that Base Plate A was immersed only in an aqueous solution of polyvinyl pyrolidone, not in water.

(Embodiment II according to this invention)

Cell $A_1$ was used.

(Experiment)

Figure 4:
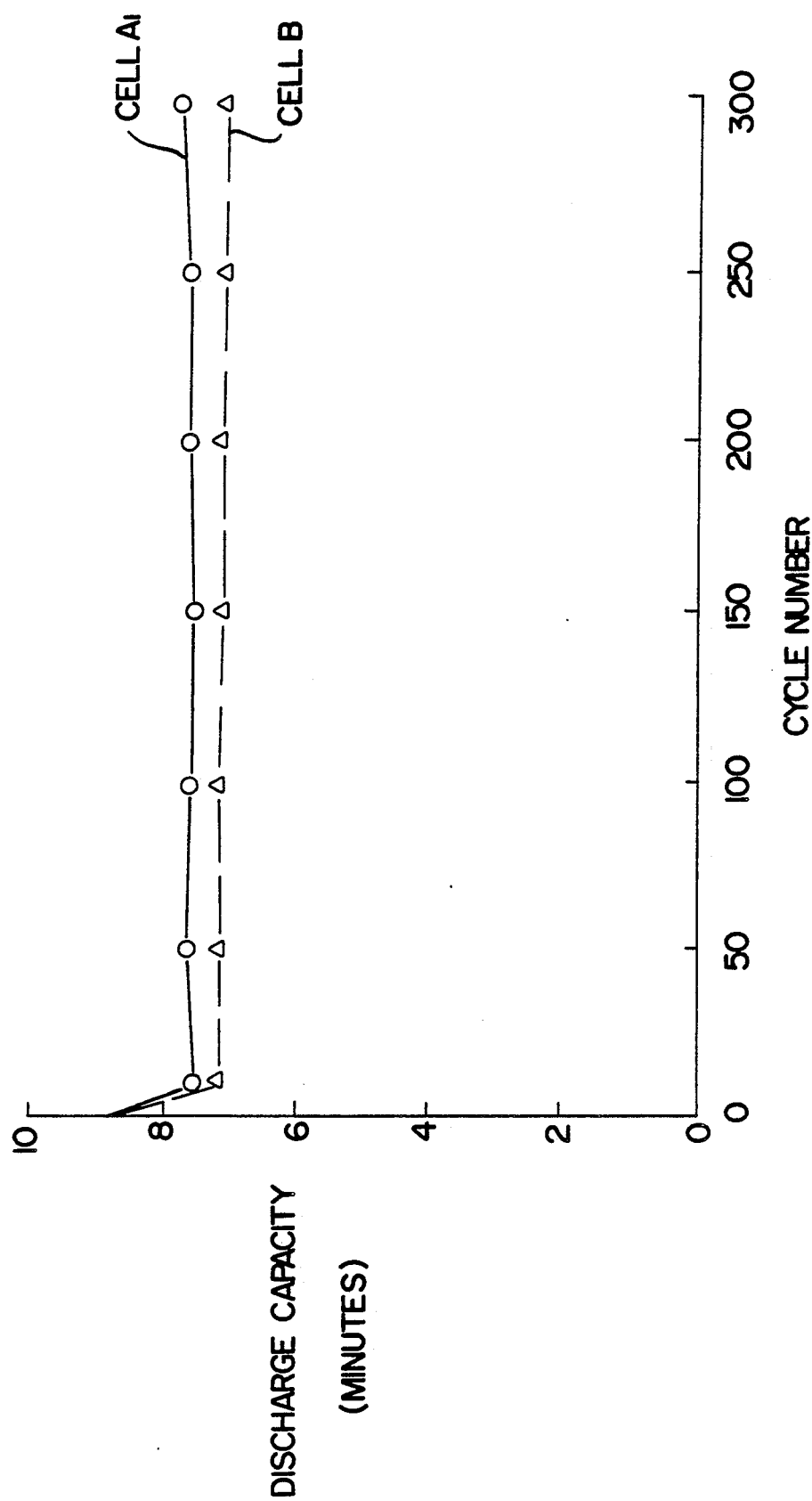
FIG. 4 is a graph showing cycle characteristics of Cells $A_1$ and B according to the present invention.

Cycle characteristics of Cells $A_1$ and B were checked and are shown in FIG. 4. The experiment conditions were the same as in Embodiment A.

FIG. 4 shows Cell B had an inferior cycle characteristic than Cell $A_1$. This is attributed to the followings:

In the case of Cell $A_1$, Base Plate A had already contained water when it was immersed in an aqueous solution of polyvinyl pyrolidone. Accordingly, the above solution with a higher coefficient of viscosity than water was mixed with water and easily permeated deep inside Base Plate A, whereby inactivation of the active material was restricted. In the case of Cell B, Base Plate A contained air in its pores when it was immersed in the above solution. Since air was hardly substituted with polyvinyl pyrolidone, polyvinyl pyrolidone existed only on a surface of Base Plate A. As a result, inactivation of the active material was not fully be restricted.

Embodiment II

Embodiment A]

(Embodiment according to this invention)

Base Plate A was immersed in water and then in an aqueous solution of polyvinyl pyrolidone (degree of polymerization: 350–1,000) having a concentration of 5%, and then dried at a temperature of 70°–85° C., whereby to produce a cadmium negative electrode.

Cell C having a nominal capacity of 1,200 mAh was produced by the same method as in Pre-experiment I except that the above-obtained cadmium negative electrode was used.

(Comparative example I)

Cell $Y_1$ was produced by the same method as Cell C except that Base Plate A was immersed in an aqueous solution of polyvinyl alcohol having a concentration of 5% instead of the aqueous solution of polyvinyl pyrolidone.

(Comparative example II)

Cell $Y_2$ was produced by the same method as Cell C except that Base Plate A was immersed in an aqueous solution of methyl cellulose having a concentration of 1% instead of the aqueous solution of polyvinyl pyrolidone.

(Comparative example III)

Cell $Y_3$ was produced by the same method as Cell C except that Base Plate A was not immersed in water or in any other solution.

(Experiment I)

Figure 5:
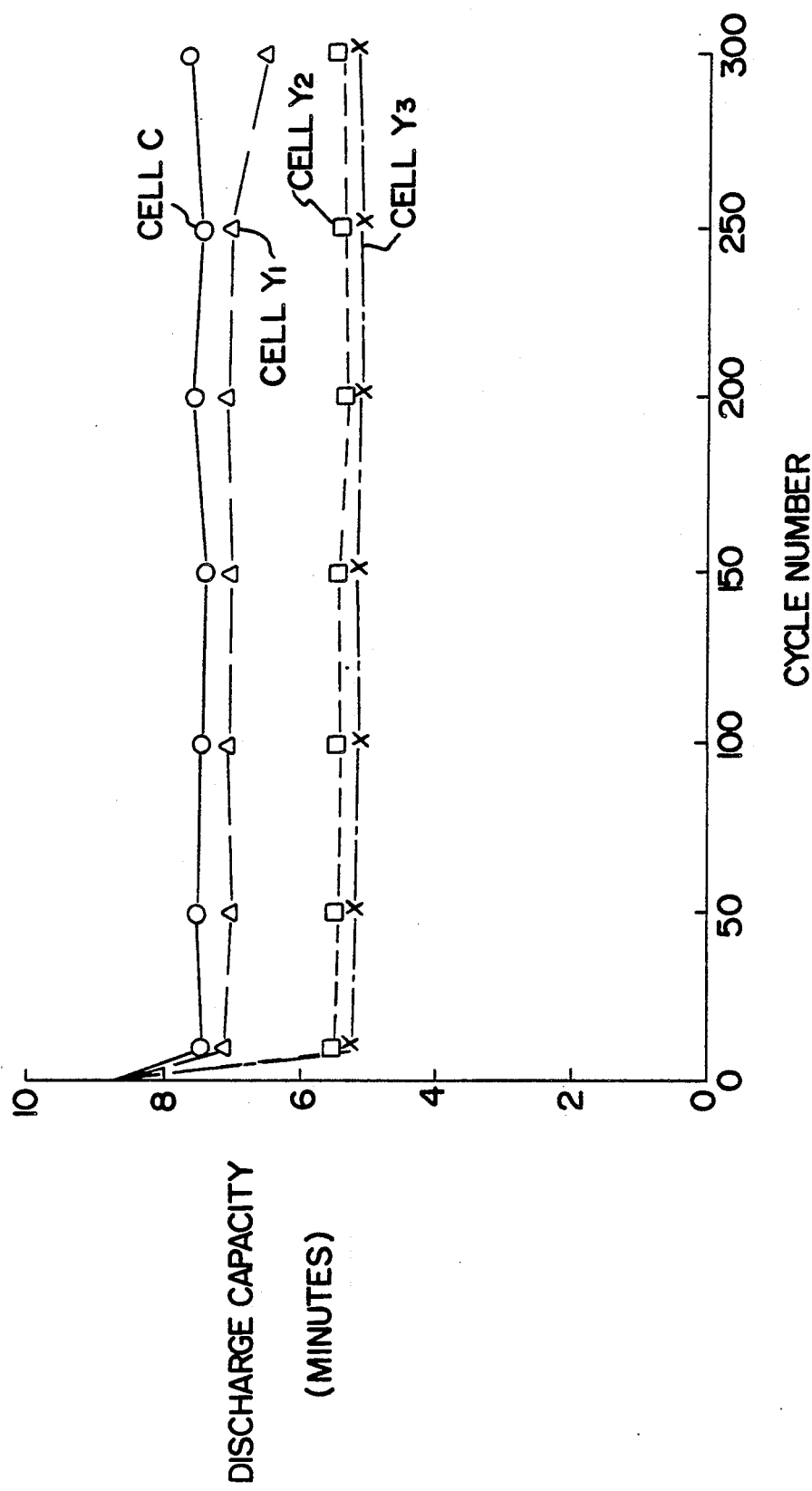
FIG. 5 is a graph showing the cycle characteristic of Cells C according to the present invention and Cells $Y_1$ through $Y_3$ as comparative examples.

Cycle characteristics of Cells C and $Y_1$ through $Y_3$ were checked and are shown in FIG. 5. The experiment conditions were the same as in Embodiment A of Embodiment I.

Reduction of capacity during the initial stage of discharge was small in Cell C according to this invention but drastically large in Cells $Y_2$ and $Y_3$ as comparative examples. In the case of Cell $Y_1$, although the above reduction was small, another reduction was seen after approximately the 250th cycle.

(Experiment II)

Concerning Cells C and $Y_1$ through $Y_3$, the amount of carbonate ion retained in the electrolyte after overdischarging was checked, and the results are shown in Table 1. The experiment conditions were the same as in Pre-experiment I. If carbonate ion was found in the cell, it means that the additive—polyvinyl pyrolidone, polyvinyl alcohol or methyl cellulose—was decomposed. In other words, this experiment was done in order to find the exiting status of the additive in the negative electrode.

TABLE 1

| Cell | Amount of carbonic ion (N) |
| --- | --- |
| C | 1.2 |
| $Y_1$ | 2.2 |
| $Y_2$ | 1.8 |
| $Y_3$ | 1.1 |

The amount of carbonate ion retained in Cell C was as small as that retained in Cell $Y_3$ having no additive in its negative electrode. It means the amount of carbonate ion in Cell C was remarkably reduced than those of Cells $Y_1$ and $Y_2$.

The reason is: since polyvinyl pyrolidone was restricted from decomposing and from eluting and so was strongly retained in the cadmium negative electrode, the effects of adding polyvinyl pyrolidone were maintained for a long period.

[Embodiment B]

Several cells were produced by the same method as Cell C except that polyvinyl pyrolidone (degree of polymerization: 350–1,000) was employed in various densities (namely, in various amounts).

(Experiment)

Figure 6:
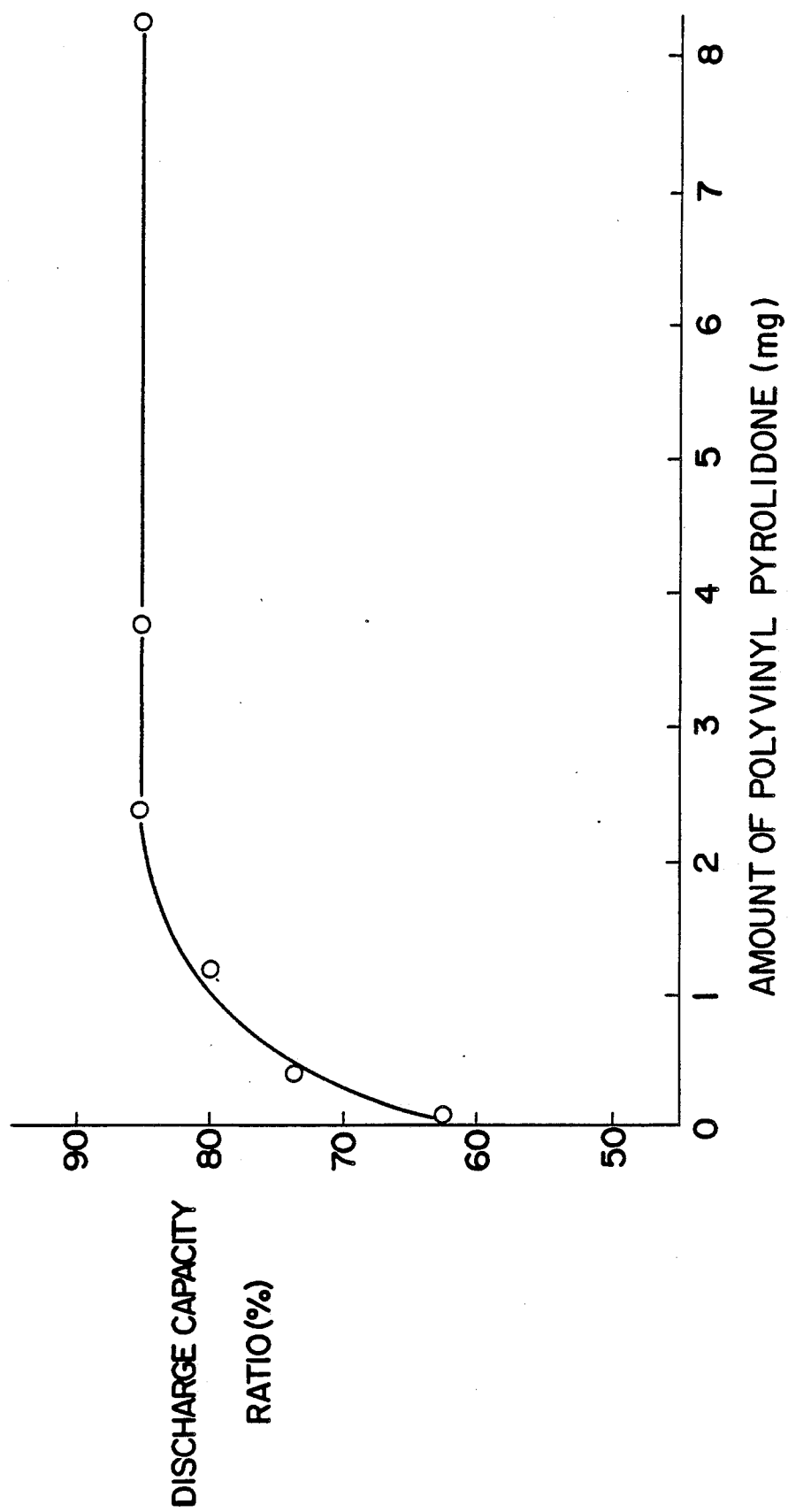
FIG. 6 is a graph showing the relationship between the amount of polyvinyl pyrolidone and the discharge capacity ratio.

The relationship between the concentration of polyvinyl pyrolidone and the discharge capacity ratio was checked concerning above cells. The results are shown in FIG. 6. Each cell was charged by 120 mA for 16 hours and discharged by 10A until the voltage was reduced down to 0.8 V. The discharge capacity ratio in this experiment means the ratio of the discharge capacity after 10th cycle against that after the first cycle.

As apparent from FIG. 6, the discharge capacity ratio was increased when the amount of polyvinyl pyrolidone was 2 mg or more against 1 g of the active material. Accordingly, it is desirable to add polyvinyl pyrolidone in 2 mg or more against 1 g of the active material.

[Embodiment C]

(Embodiment I according to this invention)

Base Plate A was exposed to electrochemical formation, immersed in an aqueous solution of polyvinyl pyrolidone (degree of polymerization: 350–1,000), immersed in an alkaline solution of 100° C. and rinsed. Then, a surface of the plate was brushed and dried to produce a cadmium negative electrode.

Cell $D_1$ was produced by the same method as Cell C except that the above-obtained cadmium negative electrode was used.

Brushing the surface of Base Plate A caused polyvinyl pyrolidone to be existent only inside the cadmium negative electrode.

(Embodiment II according to this invention)

Cell $D_2$ was produced by the same method as Cell $D_1$ except that the surface of Base Plate A was not brushed.

(Comparative example I)

Cell X was produced by the same method as Cell $D_1$ except that a cadmium negative electrode was produced without the process of adding polyvinyl pyrolidone or thereafter.

(Experiment I)

Figure 7:
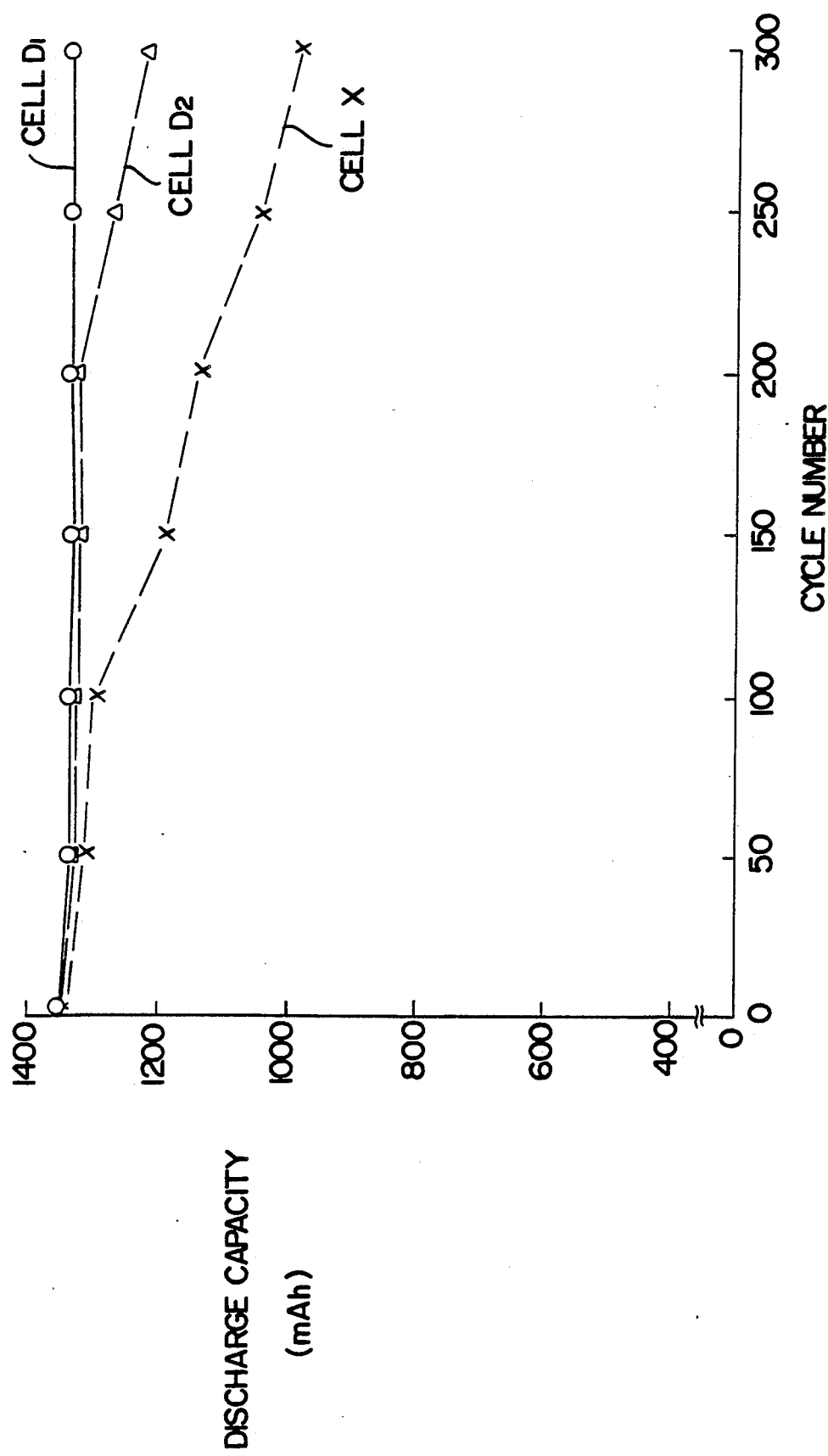
FIG. 7 is a graph showing cycle characteristics of Cells $D_1$ and $D_2$ according to the present invention and Cell X as a comparative example.

Cycle characteristics of Cells $D_1$, $D_2$ and X were checked and are shown in FIG. 7. Each cell was charged by 1,800 mA for an hour and discharged by 1,200 mA until the voltage was reduced down to 0.8 V.

The cycle characteristics of Cells $D_1$ and $D_2$ were more excellent than that of Cell X.

This is attributed to the followings: since Base Plate A was immersed in the alkaline solution of 100° C. in the case of Cell $D_1$ and $D_2$, particles of polyvinyl pyrolidone were bridged to be strongly retained in the negative electrode. This effect of the alkaline solution is combined with the effects of polyvinyl pyrolidone to realize an excellent cycle characteristic.

Comparing Cells $D_1$ and $D_2$, while the former showed substantially no decrease of the discharge capacity even after the 300th cycle, the latter gradually decreased its discharge capacity after approximately the 200th cycle. This is attributed to that the inferior oxygen gas absorbing ability of the negative electrode of Cell $D_2$ raised the inner pressure of the cell to generate a leakage of the electrolyte. This will b explained in detail in Experiment II.

(Experiment II)

Figure 8:
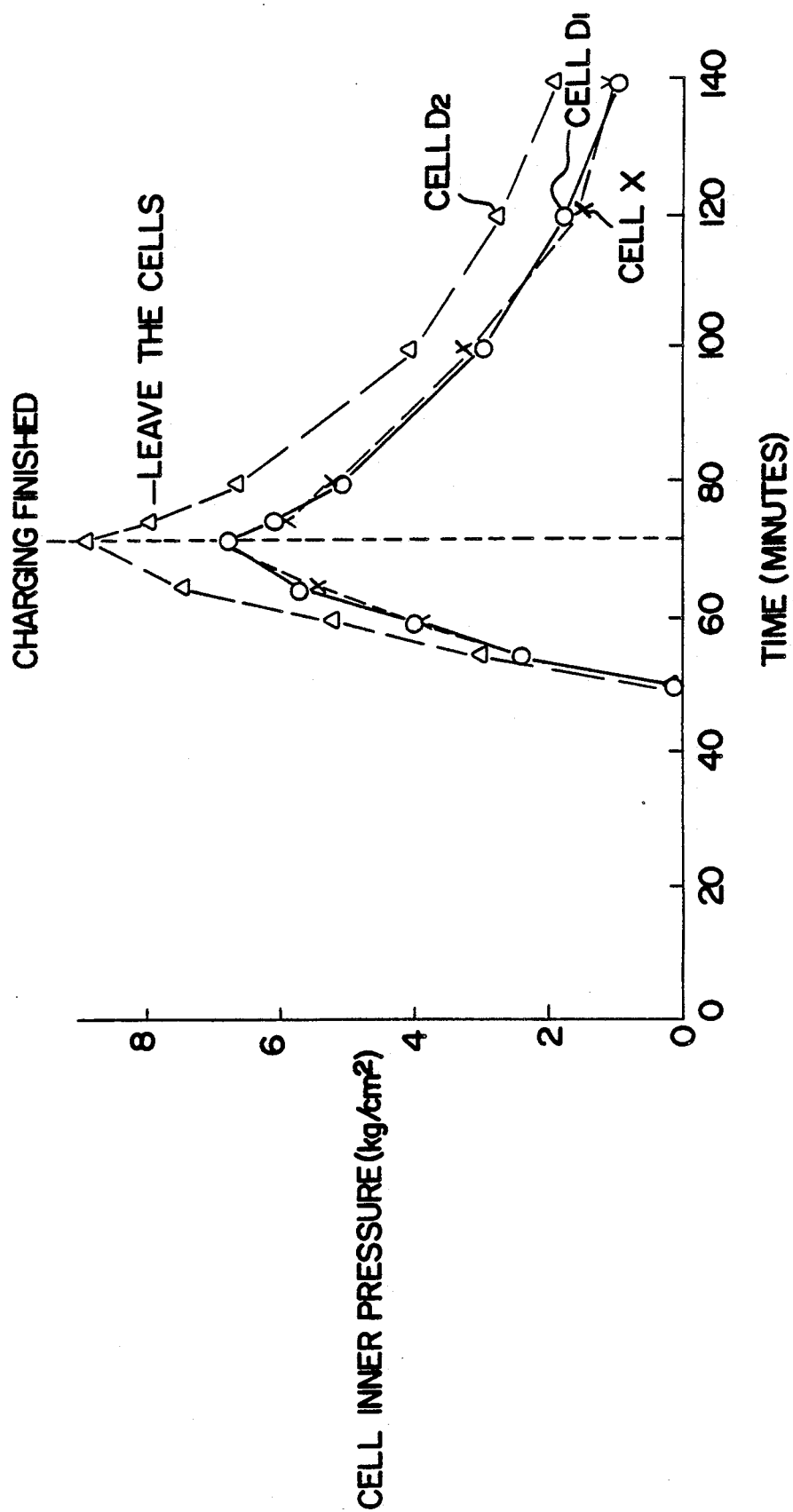
FIG. 8 is a graph showing the relationship between the length of time during which Cells $D_1$, $D_2$ and X are charged and left and their inner pressure.

Cells $D_1$, $D_2$ and X were charged by 1,800 mA for 72 minutes and left, thereafter how the inner pressure of each cell was changed was checked. The results are shown in FIG. 8.

Cell $D_1$ having polyvinyl pyrolidone strongly retained in the negative electrode showed as low an inner pressure as Cell X with no polyvinyl pyrolidone. This means Cell $D_1$ had an excellent oxygen gas absorbing ability, which leads to the excellent cycle characteristic mentioned in Experiment I.

[Embodiment D]

(Embodiment I according to this invention)

Base Plate A was immersed in an aqueous solution of polyvinyl pyrolidone having a concentration of 5% (degree of polymerization: 350–1,000) and then in a 100° C. alkaline solution. Then, the plate was charged by 400 mA for 16 hours and discharged by 400 mA until the electric potential was reduced to −0.8 V, whereby to produce a cadmium negative electrode having a capacity of 3,000 mAh. This electrode will be referred to as Electrode $e_1$.

(Embodiment II according to this invention)

Electrode $e_2$ was produced by the same method as Electrode $e_1$ except that Base Plate A was not immersed in the 100° C. alkaline solution.

(Comparative example)

Electrode w was produced by the same method as Electrode $e_1$ except that Base Plate A was not immersed in the aqueous solution of polyvinyl pyrolidone or in a 100° C. alkaline solution.

(Experiment I)

Utilization factors of Electrodes $e_1$, $e_2$ and w were measured and are shown in Table 2. For the measurement, thirty samples were used for each type of electrodes and the average value was calculated.

TABLE 2

| Electrode | Utilization factor (%) |
|---|---|
| $e_1$ | 85 |
| $e_2$ | 85 |
| w | 80 |

Electrodes $e_1$ and $e_2$ each showed a higher utilization factor than Electrode w, showing undischarged metal cadmium was restricted from accumulated in the former.

(Experiment II)

Electrodes $e_1$, $e_2$ and w were each employed together with a pair of same-sized nickel sintered positive electrodes, whereby to produce test cells. The test cells will be referred to as Cells $E_1$, $E_2$ and W, respectively.

Figure 9:
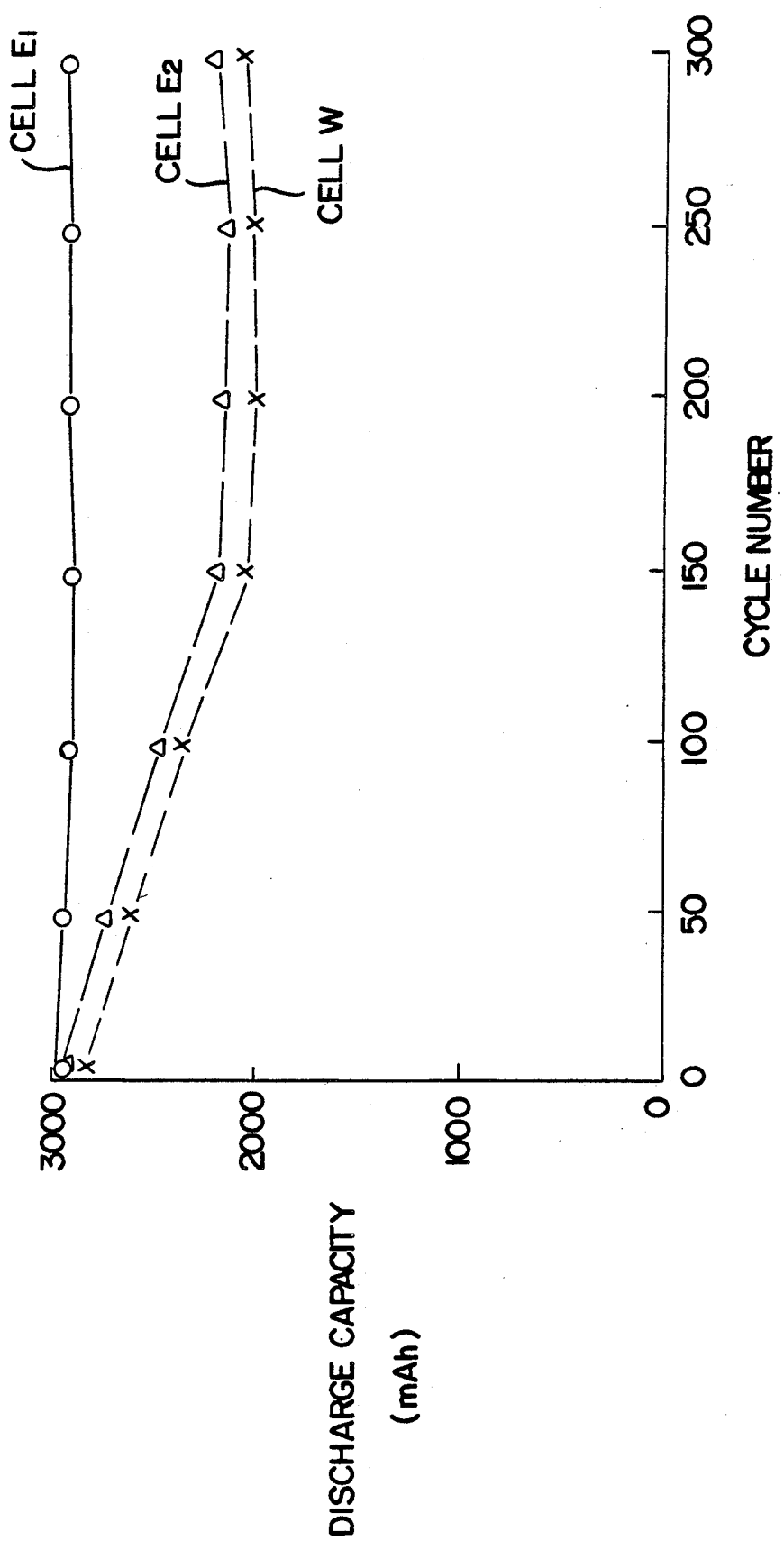
FIG. 9 is a graph showing cycle characteristics of Cells $E_1$ and $E_2$ according to the present invention and Cell W as a comparative example.

Cycle characteristics of the above cells were checked and are shown in FIG. 9. Each cell was charged by 1,000 mA for 4.8 hours and discharged by 3,000 mA until the voltage was reduced to 0.8 V.

Cells $E_1$ and $E_2$ showed more excellent cycle characteristics than Cell W. Comparing the cycle characteristics of Cells $E_1$ and $E_2$, the former was much better. The reason will follow.

In the case of Cell $E_1$, Base Plate A was immersed in the alkaline solution after added with polyvinyl pyrolidone. Accordingly, particles of polyvinyl pyrolidone were bridged with one another to maintain its effects for a long period. Moreover, Base Plate A was exposed to electrochemical formation, the active material was more activated. These two factors were combined to realize an excellent cycle characteristic. In the case of Cell $E_2$, omitting the step of immersing in the alkaline solution allowed polyvinyl pyrolidone to be eluted, which lowered its effects.

Embodiment III

(Embodiment I)

90 wt. % of cadmium oxide, 10 wt. % of metal cadmium as a reserve charging agent, 0.5 wt. % of polyvinyl pyrolidone (degree of polymerization: 350–1,000), approx. 1 wt. % of acrylic fiber as a reinforcing agent, 0.1 wt. % of phosphate soda as a hydration preventor and an appropriate amount of water were kneaded to obtain an active material paste. The paste was coated on both surfaces of a conductive substrate and dried to obtain an unhydrated electrode plate. The unhydrated electrode plate was prehydrated in 100° C., 25% NaOH for 10 minutes to produce a hydrated electrode plate, and then the hydrated electrode plate was rinsed and dried to produce a cadmium negative electrode.

This cadmium negative electrode was subjected to the same procedure as in Pre-experiment I to produce an SC-size cell having a nominal capacity of 1,300 mAh. The cell will be referred to as Cell $F_1$.

(Embodiment II)

Cell $F_2$ was produced by the same method as Cell $F_1$ except that the prehydration was done in 70° C. NaOH.

(Experiment)

Cycle characteristics of Cells $F_1$ and $F_2$ were checked and are shown in FIG. 10. The cells were charged by 0.3C for 4.8 hours and discharged by 1C.

While Cell $F_1$ maintained its capacity above 1,200 mAh after the 350th cycle, Cell $F_2$ lowered its capacity down to approx. 1,100 mAh after the 350th cycle.

From the above, it is apparent that the prehydration is desirably conducted at a temperature of 100° C. or more.

Although phosphate soda was used as the hydration preventor in the above, phosphate other than phosphate soda, silicate, arsenate or chromate may be used.

Embodiment IV

(Embodiment)

An active material mainly comprising cadmium oxide and metal cadmium, hydroxypropyl cellulose (HPC) as a binder, and water were kneaded to obtain an active material paste. The paste was coated on both surfaces of a conductive substrate and dried to produce Base Plate B. Base Plate B was immersed in an 8 N aqueous solution of sodium hydroxide to hydrate the cadmium oxide into cadmium hydroxide. Then, Base Plate B was fully rinsed to remove alkali and dried to produce a hydrated base plate. The hydrated base plate was immersed in a 5% aqueous solution of polyvinyl pyrolidone (degree of polymerization: 350–1,000) and dried, whereby polyvinyl pyrolidone was coated on a surface of the active material to produce a cadmium negative electrode.

The cadmium negative electrode was subjected to the same procedure as that in Pre-experiment I, whereby to produce an SC-size cell. The cell will be referred to as Cell G.

(Comparative example I)

Cell $V_1$ was produced by the same method as Cell G except that Base plate B (neither hydrated nor added with polyvinyl pyrolidone) was used as a negative electrode plate.

(Comparative example II)

Cell $V_2$ was produced by the same method as Cell G except that the hydrated base plate (without polyvinyl pyrolidone) was used as a negative electrode plate.

(Experiment)

Cycle test was conducted concerning Cells G, $V_1$ and $V_2$. The results are shown in FIG. 11. The cells were charged by 0.1C for 16 hours and discharged by 10A. The capacity ratio was calculated with the initial capacity of each cell as 100%.

The capacity of Cell $V_1$ was already small at the initial stage. Cell $V_2$, despite its large initial capacity, lowered it in the course of the test. Cell G had a large initial capacity and also maintained it at substantially the same level.

It is apparent from the above that the negative electrode plate is desirably hydrated and also added with polyvinyl pyrolidone.

Although water was used as a solvent of polyvinyl pyrolidone in the above embodiment, alcohol, chlorinated hydrocarbons or any other substance may be used only if it dissolves polyvinyl pyrolidone.

The coating method of the solvent may be rolling, spraying, or the like as well as immersing.

Embodiment V

(Embodiment)

Cell H was produced by the same method as Cell G except that the cadmium negative electrode was produced by immersing Base Plate B in an aqueous solution of a mixture of powdered carbon and polyvinyl pyrolidone (degree of polymerization: 350–1,000) and drying it.

(Comparative example)

Cell U was produced by the same method as Cell H except that polyvinyl alcohol was used instead of polyvinyl pyrolidone.

(Experiment)

Cycle test was conducted concerning Cells H and U. The results are shown in FIG. 12. The cells were charged by 1.5C for an hour and discharged by 1C.

While Cell U lowered its capacity in the course of the test and eventually caused shortcircuiting, Cell H maintained its large capacity substantially at the same level.

The cells were disassembled to find out why. Cell U stored a large amount of unreacted metal cadmium, which lowered the capacity. Moreover, the metal cadmium was segregated and also its crystals were extended through the separator, which caused shortcircuiting.

In the case of Cell H, since only a small amount of unreacted metal cadmium was accumulated, inactivation of the active material was restricted. There was no segregation of the metal cadmium or no extension of its crystals. These facts are considered to contribute to the excellent cycle characteristic. Use of powdered carbon in addition to polyvinyl pyrolidone kept the conductivity high, which caused excellent oxygen gas recombination ability.

Although the present invention has been fully described by way of embodiments with references to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A rechargeable alkaline storage cell comprising:
a negative electrode including a cadmium active material, said negative electrode including polyvinyl pyrolidone having a degree of polymerization of 350–1,000;
a positive electrode;
a separator interposed between said negative and positive electrodes; and
an alkaline electrolyte included in said separator.

2. A rechargeable alkaline storage cell of claim 1, wherein said negative electrode is a sintered-type electrode, which has a sintered plaque.

3. A rechargeable alkaline storage cell of claim 1, wherein said negative electrode is a paste-type electrode, which comprises a paste of active material and a conductive substrate.

4. A rechargeable alkaline storage cell of claim 1, wherein polyvinyl pyrolidone is contained only inside said negative electrode.

5. A rechargeable alkaline storage cell of claim 1, wherein polyvinyl pyrolidone is contained in at least 2 mg against 1 g of the cadmium active material.

6. A manufacturing method of a rechargeable alkaline storage cell, comprising:
a first step of filling a nickel sintered plaque with a cadmium active material to produce a base plate;
a second step of immersing the base plate in a solution of polyvinyl pyrolidone having a degree of polymerization of 350–1,000 to produce a cadmium negative electrode; and
a third step of winding the negative electrode and a positive electrode with a separator therebetween to obtain an assembly and loading the assembly in a cell can while impregnating the separator with an alkaline electrolyte.

7. A method of claim 6, wherein the base plate is filled with water after said first step.

8. A method of claim 6, wherein the cadmium negative electrode is immersed in an alkaline solution having a temperature of 100° C. at the lowest after said second step.

9. A method of claim 8, wherein a surface of the cadmium negative electrode is brushed after immersed in the solution.

10. A method of claim 8, wherein the cadmium negative electrode is subjected to electrochemical formation after immersed in the solution.

11. A manufacturing method of a rechargeable alkaline storage cell, comprising:
a first step of coating a paste comprising a cadmium active material and a binder on a conductive substrate to produce a base plate;
a second step of immersing the base plate in a solution of polyvinyl pyrolidone having a degree of polymerization of 350–1,000 to produce a cadmium negative electrode; and
a third step of winding the negative electrode and a positive electrode with a separator therebetween to obtain an assembly and loading the assembly in a cell can while impregnating the separator with an alkaline electrolyte.

12. A method of claim 11, wherein the cadmium active material mainly comprises cadmium oxide and the base plate is immersed in an alkaline solution to hydrate the cadmium oxide after said first step.

13. A method of claim 11, wherein the solution of polyvinyl pyrolidone includes a conductive material.

14. A method of claim 13, wherein the conductive material is selected from the group consisting of powdered carbon, an alkali resistant metal and a conductive polymeric material.

15. A manufacturing method of a rechargeable alkaline storage cell, comprising:
a first step of mixing an active material mainly comprising cadmium oxide, polyvinyl pyrolidone having a degree of polymerization of 350–1,000, water and a hydration preventor to produce an active material paste while preventing hydration of the cadmium oxide;
a second step of coating the active material paste on a porous conductive substrate to produce an unhydrated electrode plate;
a third step of prehydrating the unhydrated electrode plate in an alkaline solution having a temperature of 100° C. or higher to produce a cadmium negative electrode; and
a fourth step of winding the negative electrode and a positive electrode with a separator therebetween to obtain an assembly and loading the assembly in a cell can while impregnating the separator with an alkaline electrolyte.

16. A method of claim 15, wherein the hydration preventor is selected from the group consisting of phosphate, silicate, arsenate and chromate.

* * * * *